United States Patent
Imai et al.

(10) Patent No.: US 8,300,186 B2
(45) Date of Patent: *Oct. 30, 2012

(54) LIQUID CRYSTAL DISPLAY DEVICE COMPRISING A REFLECTION REGION HAVING TILTED FIRST AND SECOND RECESSES AND METHOD FOR MANUFACTURING THE SAME

(75) Inventors: Hajime Imai, Matsusaka (JP); Tetsuo Kikuchi, Matsusaka (JP); Hideki Kitagawa, Tsu (JP); Yoshihito Hara, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 972 days.

This patent is subject to a terminal disclaimer.

(21) Appl. No.: 12/299,138

(22) PCT Filed: Apr. 5, 2007

(86) PCT No.: PCT/JP2007/057674
§ 371 (c)(1),
(2), (4) Date: Oct. 31, 2008

(87) PCT Pub. No.: WO2007/129518
PCT Pub. Date: Nov. 15, 2007

(65) Prior Publication Data
US 2009/0195740 A1 Aug. 6, 2009

(30) Foreign Application Priority Data
May 1, 2006 (JP) .................. 2006-127683

(51) Int. Cl.
*G02F 1/1335* (2006.01)

(52) U.S. Cl. ..................................... 349/113

(58) Field of Classification Search ................. 349/113, 349/114
See application file for complete search history.

(56) References Cited

U.S. PATENT DOCUMENTS

| | | | |
|---|---|---|---|
| 6,208,395 B1 | 3/2001 | Kanoh et al. | |
| 6,771,346 B2 | 8/2004 | Sugimoto et al. | |
| 6,839,107 B2 | 1/2005 | Kobashi | |
| 7,106,403 B2 * | 9/2006 | Murai et al. | 349/114 |
| 2002/0051107 A1 * | 5/2002 | Nagayama et al. | 349/113 |

(Continued)

FOREIGN PATENT DOCUMENTS

JP 2003-149679 A 5/2003

(Continued)

OTHER PUBLICATIONS

Official Communication issued in International Patent Application No. PCT/JP2007/057674, mailed on Jul. 3, 2007.

(Continued)

*Primary Examiner* — Mark Robinson
*Assistant Examiner* — Dennis Y Kim
(74) *Attorney, Agent, or Firm* — Keating & Bennett, LLP

(57) ABSTRACT

A liquid crystal display device, which can be a transflective-type or a reflection-type, includes a reflection section arranged to reflect incident light toward a display surface, wherein the reflection section includes a reflective layer provided on a substrate, and includes a first recess formed in a surface of the reflective layer and a second recess formed in the surface of the reflective layer in the first recess. The first recess corresponds to an aperture of a Cs metal layer, and the second recess corresponds to an aperture of a semiconductor layer. The transflective-type or reflection-type liquid crystal display device has a high image quality at low cost.

19 Claims, 11 Drawing Sheets

U.S. PATENT DOCUMENTS

| | | | |
|---|---|---|---|
| 2003/0089949 | A1 | 5/2003 | Lin et al. |
| 2004/0027702 | A1 | 2/2004 | Matsushita et al. |
| 2005/0122452 | A1* | 6/2005 | Yoshida et al. ............... 349/114 |
| 2005/0270447 | A1 | 12/2005 | Tasaka et al. |
| 2006/0139526 | A1* | 6/2006 | Ahn et al. .................... 349/114 |
| 2006/0238676 | A1* | 10/2006 | Yang et al. .................... 349/114 |
| 2009/0185119 | A1* | 7/2009 | Kikuchi et al. ............... 349/113 |
| 2009/0195741 | A1* | 8/2009 | Hara et al. .................... 349/114 |
| 2010/0014031 | A1* | 1/2010 | Kikuchi et al. ............... 349/113 |
| 2010/0045885 | A1* | 2/2010 | Imai et al. ........................ 349/39 |

FOREIGN PATENT DOCUMENTS

| | | |
|---|---|---|
| JP | 2005-055808 A | 3/2005 |
| JP | 2005-345757 A | 12/2005 |

OTHER PUBLICATIONS

Kikuchi et al.: "Liquid Crystal Display and Method for Manufacturing Liquid Crystal Display," U.S. Appl. No. 12/299,154, filed Oct. 31, 2008.

English translation of the official communication issued in counterpart International Application No. PCT/JP2007/057674, mailed on Nov. 27, 2008.

Kikuchi et al., "Liquid Crystal Display Device and Process for Producing Liquid Crystal Display Device," U.S. Appl. No. 12/518,719, filed Jun. 11, 2009.

Imai et al., "Liquid Crystal Display Device," U.S. Appl. No. 12/523,935, filed Jul. 21, 2009.

\* cited by examiner (a)

PRIOR ART (b)

PRIOR ART

LIQUID CRYSTAL DISPLAY DEVICE COMPRISING A REFLECTION REGION HAVING TILTED FIRST AND SECOND RECESSES AND METHOD FOR MANUFACTURING THE SAME

BACKGROUND OF THE INVENTION

1. Field of the Invention

The present invention relates to a reflection-type or transflective-type liquid crystal display device which performs display by utilizing reflected light.

2. Description of the Related Art

Liquid crystal display devices (LCDs) are often transmission-type LCDs which utilize backlight from behind the display panel as a light source, reflection-type LCDs which utilize reflected external light as a light source, and transflective-type LCDs which utilize both reflected external light and backlight light sources. The reflection-type LCD and the transflective-type LCD are characterized in that they have smaller power consumptions than that of the transmission-type LCD, and their displayed images are easy to see in a bright place. The transflective-type LCD is characterized in that the displayed images are easier to see than that of the reflection-type LCD, even in a dark place.

FIG. 13 is a cross-sectional view showing an active matrix substrate 100 in a conventional reflection-type LCD (e.g., Japanese Laid-Open Patent Publication No. 9-54318).

As shown in FIG. 13, an active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and the metal layer 108 are subjected to etching by using one mask, and are thus arranged to have an island-shaped multilayer structure. Thereafter, the reflective layer 110 is provided on this multilayer structure, thereby providing a roughened reflection surface 112. Although not shown, transparent electrodes, a liquid crystal panel, a color filter substrate (CF substrate), and the like are formed above the active matrix substrate 100.

In the aforementioned active matrix substrate 100, portions of the reflective layer 110 are arranged so as to reach the insulative substrate 101 in portions where the gate layer 102 and the like are not formed (i.e., portions between the islands, hereinafter referred to as "gap portions"). Therefore, in the gap portions, the surface of the reflection surface 112 is recessed in the direction of the insulative substrate 101, thus forming a surface having deep dents (or recesses).

In the reflection-type liquid crystal display device or the transflective-type liquid crystal display device, it is necessary to allow incident light entering from various directions to be reflected by the reflection surface 112 more uniformly and efficiently over the entire display surface in order to perform bright display by utilizing reflected light. For this purpose, it is better if the reflection surface 112 is not completely planar but has moderate roughness.

However, the reflection surface 112 of the aforementioned active matrix substrate 100 has deep dents. Therefore, light is unlikely to reach the reflection surface located on the bottoms of the dents, and even if at all light reaches there, the reflected light thereof is unlikely to be reflected toward the liquid crystal panel, thus resulting in a problem in that the reflected light is not effectively used for displaying. Furthermore, there is a problem in that, since many portions of the reflection surface 112 have a large angle relative to the display surface of the liquid crystal display device, the reflected light from those portions is not effectively utilized for displaying.

FIGS. 14A and 14B are diagrams showing a relationship between the tilt of the reflection surface 112 and reflected light. FIG. 14A shows a relationship between an incident angle $\alpha$ and an outgoing angle $\beta$ when light enters a medium b having a refractive index Nb from a medium a having a refractive index Na. In this case, according to Snell's Law, the following relationship holds true:

$$Na*\sin\alpha = Nb*\sin\beta$$

FIG. 14B is a diagram showing a relationship between incident light and reflected light when incident light entering perpendicularly to the display surface of an LCD is reflected from a reflection surface which is tilted by $\theta$ with respect to the display surface (or the substrate). As shown in the figure, the incident light perpendicularly entering the display surface is reflected from the reflection surface which is tilted by angle $\theta$ with respect to the display surface, and goes out in a direction of an outgoing angle $\phi$.

According to Snell's Law, the results of calculating the outgoing angle $\phi$ according to Snell's Law with respect to each angle $\theta$ of the reflection surface are shown in Table 1.

TABLE 1

| $\theta$ | $\phi$ | 90 − $\phi$ |
|---|---|---|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle $\theta$ of the reflection surface exceeds 20 degrees, the outgoing angle $\phi$ becomes very large (i.e., 90−$\phi$ becomes very small), so that most of the outgoing light does not reach the user. Therefore, even if roughness is provided on the reflection surface of the reflective layer, it is necessary to ensure that the angle $\theta$ is 20 degrees or less in greater portions of the reflection surface in order to effectively use the reflected light.

Since the reflection surface 112 of the aforementioned active matrix substrate 100 has many portions which are greater than 20 degrees, reflected light is not very effectively used for displaying. In order to solve this problem, it might be possible to form an insulating layer under the reflective layer 110, and form the reflective layer 110 over the insulating layer. However, in this case, a step of forming an insulating layer, and a step of forming contact holes for connecting the reflective layer 110 to the drains of TFTs in the insulating layer are needed, thus resulting in a problem of an increase in the material and the number of steps.

SUMMARY OF THE INVENTION

In order to overcome the problems described above, preferred embodiments of the present invention provide a low-cost transflective-type liquid crystal display device having a high image quality.

A display device according to a preferred embodiment of the present invention is a liquid crystal display device including a reflection region arranged to reflect incident light toward a display surface, wherein, the reflection region includes a reflective layer containing a metal material and being formed on a substrate, and the reflection region includes a first recess formed on a surface of the reflective layer and a second recess formed on the surface of the reflective layer in the first recess.

In one preferred embodiment, the surface of the reflective layer inside the first recess but outside the second recess has a surface which is parallel or substantially parallel to the plane of the substrate.

In one preferred embodiment, in the reflection region, a metal layer having an aperture, an insulating layer formed above the metal layer, and a semiconductor layer having an aperture and being formed above the insulating layer are formed under the reflective layer, and the aperture of the semiconductor layer is located inside the aperture of the metal layer.

In one preferred embodiment, the first recess is formed according to the aperture of the metal layer, and the second recess is formed according to the aperture of the semiconductor layer.

In one preferred embodiment, in the reflection region, a metal layer having an aperture, an insulating layer formed above the metal layer, and a semiconductor layer having an aperture and being formed above the insulating layer are formed under the reflective layer, and the aperture of the metal layer is located inside the aperture of the semiconductor layer.

In one preferred embodiment, the first recess is formed according to the aperture of the semiconductor layer, and the second recess is formed according to the aperture of the metal layer.

In one preferred embodiment, the reflection region includes a third recess formed on the surface of the reflective layer, the third recess being formed in a region where the metal layer and the insulating layer are stacked but where the semiconductor layer is not located.

In one preferred embodiment, a plurality of the first recesses and second recesses are formed in the reflection region.

In one preferred embodiment, the first recess has a circular or substantially circular shape.

In one preferred embodiment, the second recess has a circular or substantially circular shape.

In one preferred embodiment, the first recess and the second recess each have a circular or substantially circular shape, and a center position of the first recess and a center position of the second recess are identical or substantially identical.

In one preferred embodiment, the first recess and the second recess each have a circular or substantially circular shape, and a center position of the first recess and a center position of the second recess are different.

In one preferred embodiment, at least one of the first recess and the second recess has an elliptical or substantially elliptical shape.

In one preferred embodiment, at least one of the first recess and the second recess has a quadrangular or substantially quadrangular shape.

In one preferred embodiment, the liquid crystal display device includes a semiconductor device provided on the substrate, wherein, the metal layer, the semiconductor layer, and the reflective layer are composed of same materials as those of a gate electrode, a semiconductor portion, and source/drain electrodes of the semiconductor device, respectively.

A production method for a liquid crystal display device according to a preferred embodiment of the present invention is a production method for a liquid crystal display device having a reflection region for reflecting incident light toward a display surface, including a step of forming a metal layer having an aperture, in the reflection region, a step of forming an insulating layer, above the metal layer and the aperture of the metal layer, a step of forming a semiconductor layer having an aperture, above the insulating layer, and a step of forming a reflective layer, above the semiconductor layer and the aperture of the semiconductor layer.

In one preferred embodiment, the aperture of the semiconductor layer is formed inside the aperture of the metal layer.

In one preferred embodiment, a first recess is formed in a surface of the reflective layer above the aperture of the metal layer, and a second recess is formed in the surface of the reflective layer inside the first recess.

In one preferred embodiment, the aperture of the metal layer is formed inside the aperture of the semiconductor layer.

In one preferred embodiment, a first recess is formed in a surface of the reflective layer above the aperture of the semiconductor layer, and a second recess is formed in the surface of the reflective layer inside the first recess.

In one preferred embodiment, the metal layer and the semiconductor layer each have a plurality of apertures.

In one preferred embodiment, the aperture of the metal layer and the aperture of the semiconductor layer have a circular or substantially circular shape.

In one preferred embodiment, the aperture of the metal layer and the circular aperture of the semiconductor layer have an identical center position.

In one preferred embodiment, the circular or substantially circular aperture of the metal layer and the circular or substantially circular aperture of the semiconductor layer have different center positions.

In one preferred embodiment, at least one of the aperture of the metal layer and the aperture of the semiconductor layer has an elliptical or substantially elliptical shape.

In one preferred embodiment, at least one of the aperture of the metal layer and the aperture of the semiconductor layer has a quadrangular or substantially quadrangular shape.

In one preferred embodiment, the liquid crystal display device includes a semiconductor device. A gate electrode of the semiconductor device is formed in the step of forming the metal layer, a semiconductor section of the semiconductor device is formed in the step of forming the semiconductor layer, and source/drain electrodes of the semiconductor device are formed in the step of forming the semiconductor device.

According to preferred embodiments of the present invention, low-cost transflective-type and reflection-type liquid crystal display devices having a high image quality are provided.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 2A shows the construction of pixel regions, and FIG. 2B shows the construction of a reflection section.

FIG. 3A shows the construction of a reflection section, and FIG. 3B shows the construction of a TFT section.

FIG. 4A shows a cross section of a reflection section of the first preferred embodiment; FIG. 4B shows a cross section of a reflection section of the conventional liquid crystal display device; and FIG. 4C shows surface angles at a corner portions of the reflection section.

FIG. 14A shows a relationship between an incident angle α and an outgoing angle β when light enters a medium b having a refractive index Nb from a medium a having a refractive index Na, and FIG. 14B is a diagram showing a relationship between incident light and reflected light as well as the angle of the display surface of the LCD.

DETAILED DESCRIPTION OF THE PREFERRED EMBODIMENTS

First Preferred Embodiment

Hereinafter, with reference to the drawings, a first preferred embodiment of the liquid crystal display device according to the present invention will be described.

Figure 1:
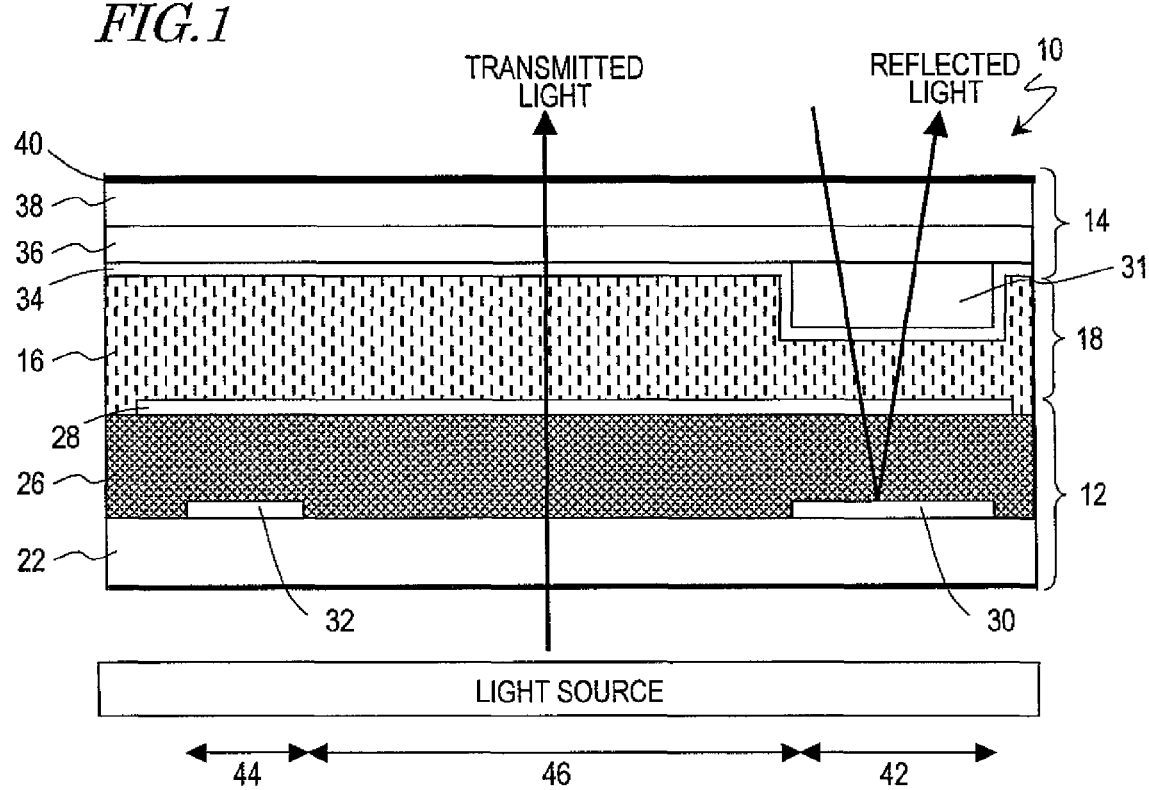
FIG. 1 is a diagram schematically showing a cross-sectional shape of the liquid crystal display device of a first preferred embodiment of the present invention.

FIG. 1 is a diagram schematically showing a cross-sectional shape of a liquid crystal display device 10 according to the present preferred embodiment. The liquid crystal display device 10 is a transflective-type liquid crystal display device (LCD) using an active matrix method. As shown in FIG. 1, the liquid crystal display device 10 includes a TFT (Thin Film Transistor) substrate 12, a counter substrate 14, such as a color filter substrate (CF substrate), and a liquid crystal layer 18 containing liquid crystal 16 which is sealed between the TFT substrate 12 and the counter substrate 14.

The TFT substrate 12 includes a transparent substrate 22, an interlayer insulating layer 26, and a pixel electrode 28, and includes reflection sections 30 and TFT sections 32. Note that gate lines (scanning lines), source lines (signal lines), and Cs lines (storage capacitor electrode lines) are also formed on the TFT substrate 12, which will be described later.

The counter substrate 14 includes a counter electrode 34, a color filter layer (CF layer) 36, and a transparent substrate 38. The upper surface of the transparent substrate 38 serves as a display surface 40 of the liquid crystal display device. Note that although the TFT substrate 12 and the counter substrate 14 each have an alignment film and a polarizer, they are not shown in the figure.

In the liquid crystal display device 10, a region where a reflection section 30 is formed is referred to as a reflection region 42, whereas a region where a TFT section 32 is formed is referred to as a TFT region 44. In a reflection region, light entering from the display surface 40 is reflected by the reflection section 30, and travels through the liquid crystal layer 18 and the counter substrate 14 so as to go out from the display surface 40. The liquid crystal display device 10 further has transmission regions 46 which are formed in regions other than the reflection regions 42 and the TFT regions 44. In the transmission regions 46, light which is emitted from a light source in the display device 10 travels through the TFT substrate 12, the liquid crystal layer 18, and the counter substrate 14 so as to go out from the display surface 40.

Note that, as shown in FIG. 1, by providing a layer 31, which is composed of, for example, a transmissive resin or the like, at the counter substrate 14 side above each reflection section 30, it is possible to reduce the thickness of the liquid crystal layer 18 in the reflection region 42 to about a half of the thickness of the liquid crystal layer 18 in the transmission region 46. As a result, the optical path lengths in the reflection region 42 and the transmission region 46 can be made equal or substantially equal. Although FIG. 1 illustrates the layer 31 as being formed between the counter electrode 34 and the CF layer 36, the layer 31 may be formed on the surface of the counter electrode 34 facing the liquid crystal layer 18.

Figure 2A:
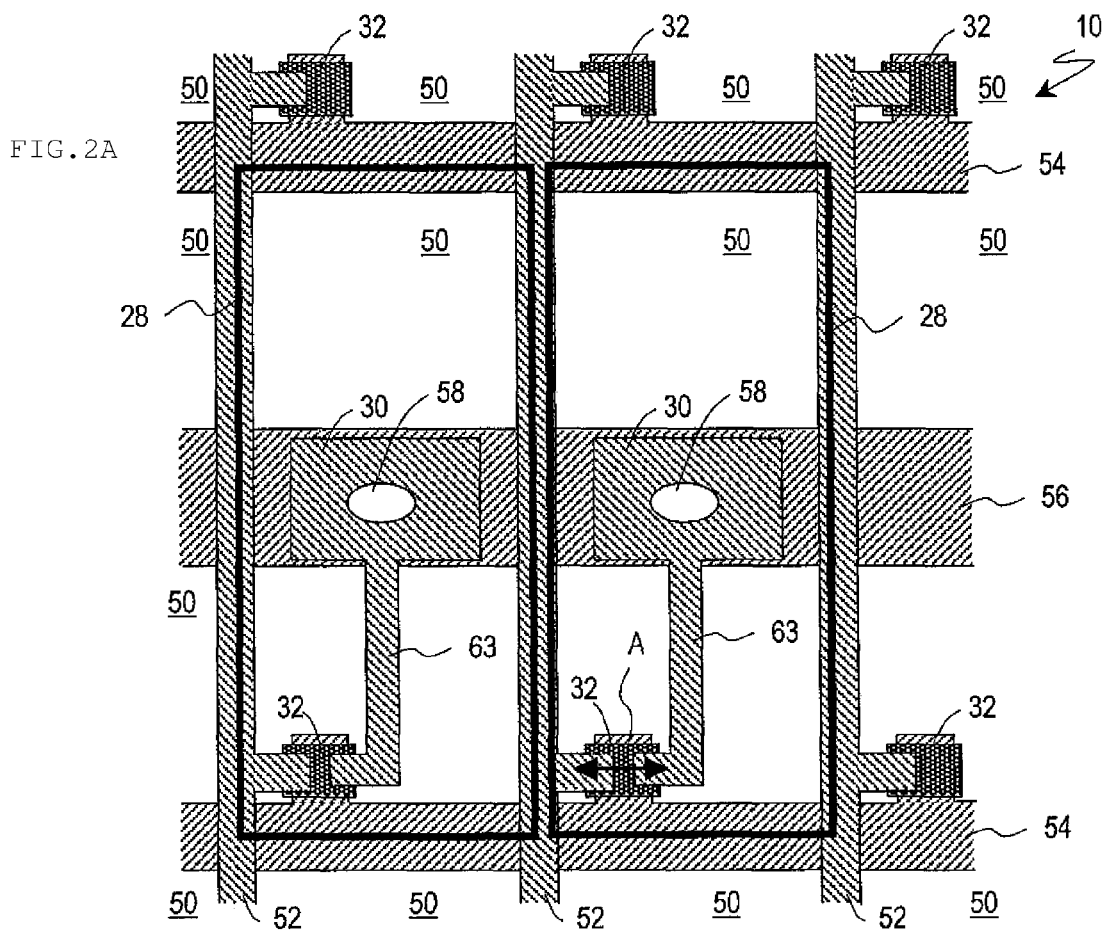
FIGS. 2A and 2B are plan views showing a liquid crystal display device of the first preferred embodiment, where

FIG. 2A is a plan view of a portion of the liquid crystal display device 10, as seen from above the display surface 40. As shown in the figure, a plurality of pixels 50 are arranged in a matrix shape on the liquid crystal display device 10. The aforementioned reflection section 30 and TFT section 32 are formed in each pixel 50, with a TFT being formed in the TFT section 32.

In the border of the pixel 50, source lines 52 extend along the column direction, and gate lines (gate metal layers) 54 extend along the row direction. In the central portion of the pixel 50, a Cs line (Cs metal layer) 56 extends along the row direction. In the interlayer insulating layer 26 of the reflection section 30, a contact hole 58 for connecting the pixel electrode 28 and the drain electrode of the TFT is formed.

Figure 2B:
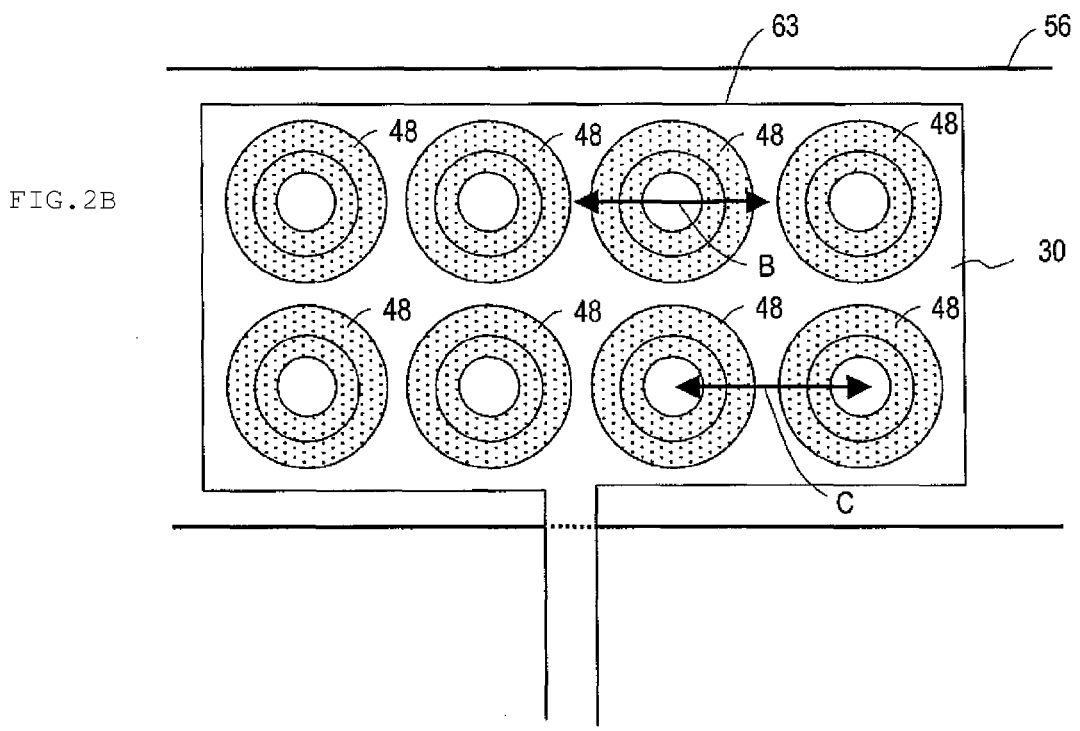

FIG. 2B is a plan view schematically showing the construction of the reflection section 30 above the Cs line 56. Note that the contact hole 58 is omitted from this figure. As shown in the figure, a plurality of circular rugged portions (tapered portions) 48 are formed in the reflection section 30. Note that, as will be described later, a reflective layer 63 is formed in the reflection section 30, the reflective layer 63 being connected to the drain electrode of the TFT in the TFT section 32.

Figure 3A:
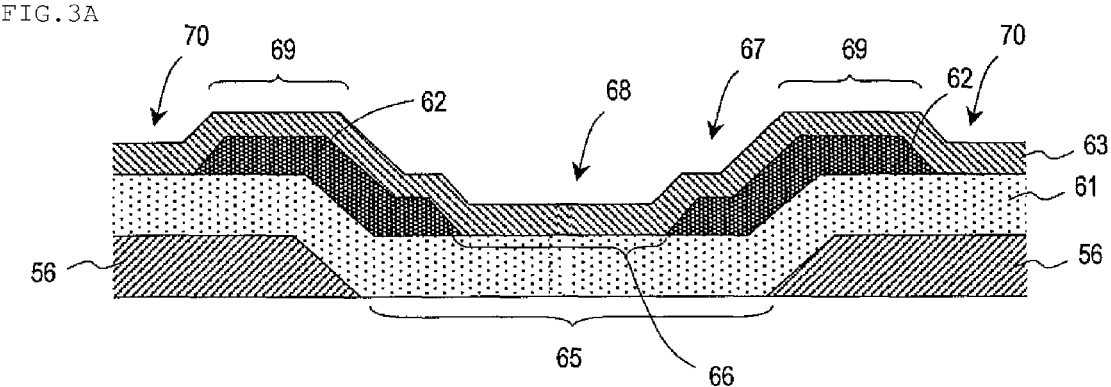
FIGS. 3A and 3B are cross-sectional views showing the construction of a TFT section and a reflection section of the first preferred embodiment, where

FIG. 3A shows a cross section of a rough portion 48 in the reflection section 30 (a cross section of a portion shown by arrow B in FIG. 2B). As shown in the figure, the Cs metal layer (metal layer) 56, the gate insulating layer 61, the semiconductor layer 62, and the reflective layer 63 are stacked in the reflection section 30. The Cs metal layer 56 has an aperture 65, and the semiconductor layer 62 has an aperture 66 which is formed inside the aperture 65 of the Cs metal layer 56.

A recess 67 is formed on the surface of the reflective layer 63, and a recess 68 is formed on the surface of the reflective layer 63 inside the recess 67. When seen perpendicularly from the transparent substrate 22, the recess 67 and the recess 68 are preferably arranged in the shape of concentric circles. Inside the recess 67, the reflective layer 63 is formed with a level difference. Inside the recess 67 but outside the recess 68, a region in which the surface of the reflective layer 63 is generally parallel to the surface of the transparent substrate 22 is formed.

The recess 67 is formed as the reflective layer 63 becomes dented because the gate insulating layer 61, the semiconductor layer 62, and the reflective layer 63 are formed over the aperture 65 of the Cs metal layer 56. The recess 68 is formed as the reflective layer 63 becomes dented because the reflective layer 63 is formed over the aperture 66 of the semiconductor layer 62.

A protrusion 69 is formed outside the recess 67, and a recess 70 is formed outside the protrusion 69. The recess 70 is formed because of the reflective layer 63 being stacked in a region where the Cs metal layer 56 and the gate insulating layer 61 are stacked but the semiconductor layer 62 is not formed.

Figure 3B:
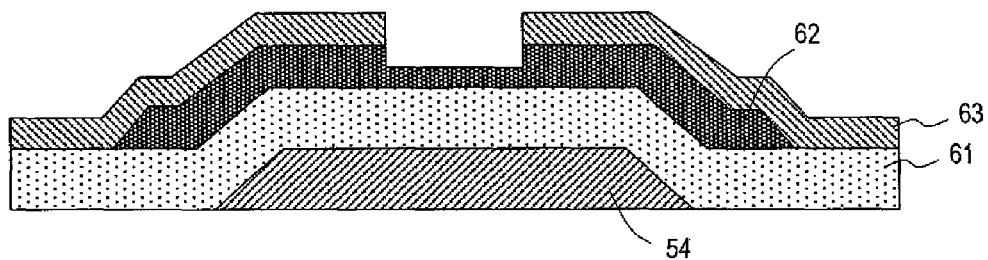

FIG. 3B is a cross-sectional view showing the construction of the gate metal layer (metal layer) 54, the gate insulating layer 61, the semiconductor layer 62, and the reflective layer 63 in the TFT section 32. The gate metal layer 54 in the TFT section 32 is formed concurrently with and from the same member as the Cs metal layer 56 of the reflection section 30. Similarly, the gate insulating layer 61, the semiconductor layer 62, and the reflective layer 63 of the TFT section 32 are formed concurrently with and from the same members as the gate insulating layer 61, the semiconductor layer 62, and the reflective layer 63 of the reflection section 30, respectively.

Figure 4A:
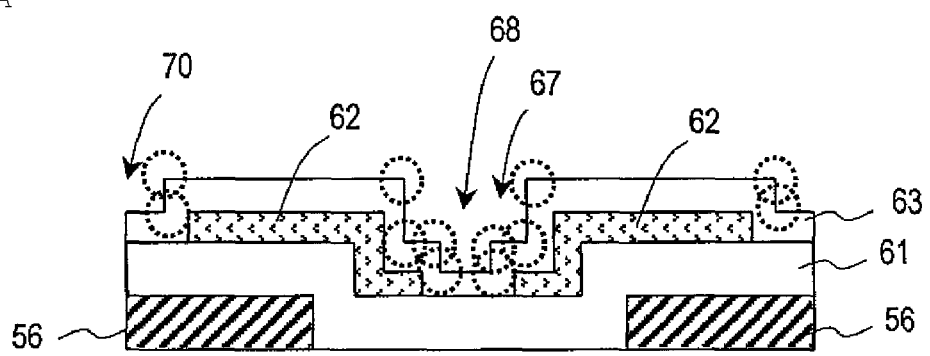
FIGS. 4A-4C are schematic diagrams showing a comparison of reflection section constructions between the first preferred embodiment and a conventional liquid crystal display device, where.
Figure 4B:
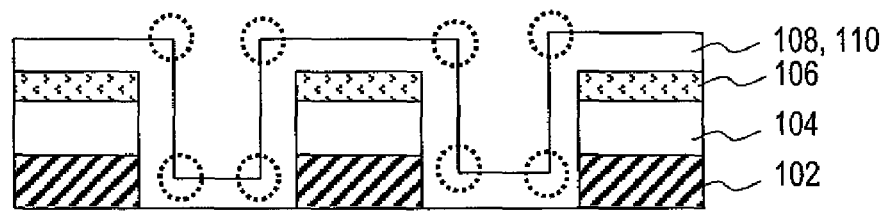
Figure 4C:
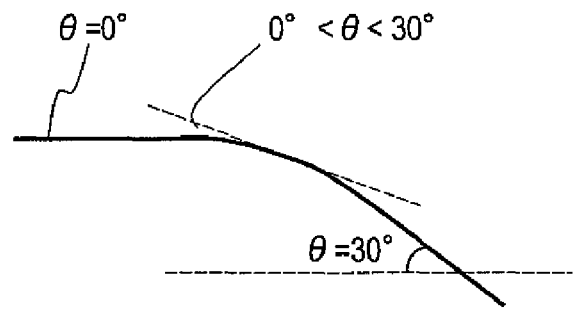
Figure 13:
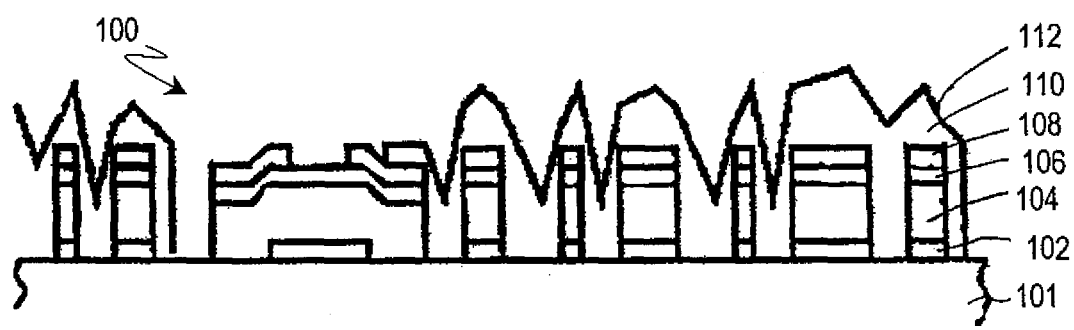
FIG. 13 is a cross-sectional view showing an active matrix substrate of a conventional reflection-type LCD.
Figure 14:
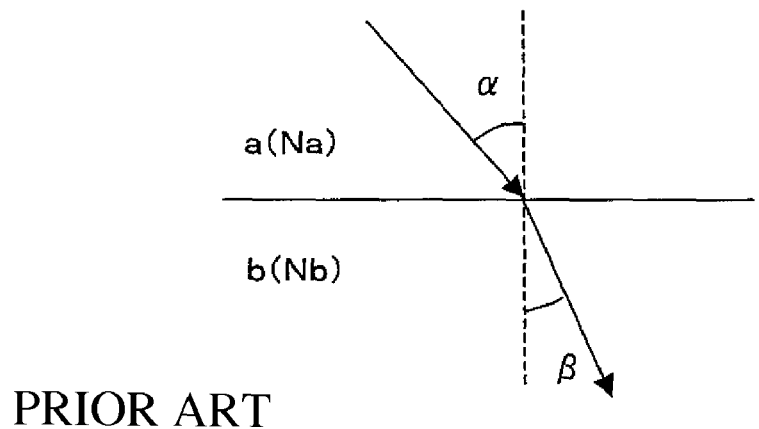
FIGS. 14A and 14B are diagrams showing a relationship between a tilt of a reflection surface and reflected light in a liquid crystal display device, where
Figure 14:
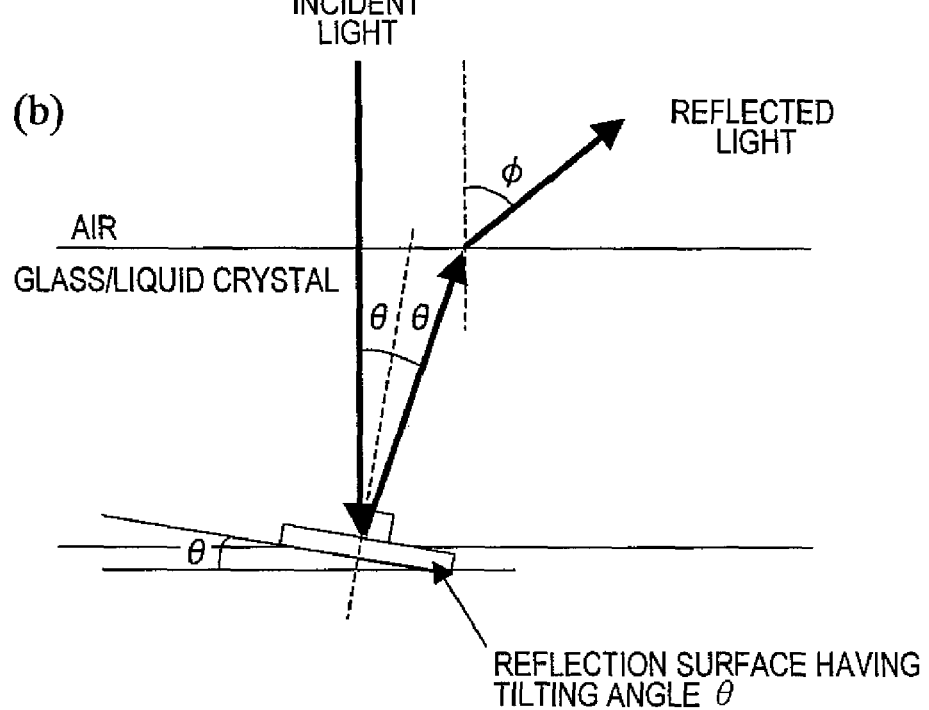

FIGS. 4A-4C are cross-sectional views comparing the structures of the reflection section 30 of the first preferred embodiment of the present invention and the reflection section of the conventional liquid crystal display device shown in FIG. 13. FIG. 4A schematically shows the structure of the reflection section 30 of the first preferred embodiment of the present invention, whereas FIG. 4B shows the structure of the reflection section of the conventional liquid crystal display device. In these figures, for simplicity, the slopes of the recesses 67, 68, and 70 in the reflection section 30 and the slopes formed in the reflection section of the conventional liquid crystal display device are illustrated as vertical surfaces. Moreover, the corner portion of any level difference (portions shown by dotted circles in the figure) is illustrated as bending at a right angle.

As shown in these figures, on the surface of the reflective layer 63 of the reflection section 30 of the first preferred embodiment, eight corner portions are formed at an edge of the upper surface and at an edge of the bottom surface of each of the recess 67 and the recess 68, and furthermore two corner portions are formed at edges of the upper surface and bottom surface of the recess 70. On the other hand, in the conventional liquid crystal display device, only four corner portions are formed in one recess of the reflection section.

In FIGS. 4A and 4B, these corners are shown as right angles. However, in an actual corner portion, as shown in FIG. 4C, a surface having an angle greater than about 20 degrees (in this figure, exemplified as about 30 degrees) with respect to the substrate is continuously formed from a plane which is substantially parallel to the substrate. Therefore, by forming more recesses in the reflection section, more surfaces having an angle of about 20 degrees or less with respect to the substrate (effective reflection surfaces) can be formed at the surface of the reflective layer 63.

As shown in FIGS. 4A and 4B in comparison, more recesses are formed in the reflection section of the first preferred embodiment of the present invention than in the conventional liquid crystal display device. Since more corner portions are formed with formation of recesses, it becomes possible to form more effective reflection surfaces on the surface of the reflective layer 63. It would also be possible for the slope which is formed between a corner portion and a corner portion of a recess to have a tilt of about 20 degrees less, whereby the area of the effective reflection surfaces can be further increased.

Moreover, the reflective layer 63 located at the bottoms of the recesses 67, 68, and 70 in the first preferred embodiment is formed on the gate insulating layer 61 or the semiconductor layer 62. On the other hand, in the conventional liquid crystal display device, the reflective layer on the bottom surfaces of the recesses is formed on the glass substrate, and neither a gate insulating layer nor a semiconductor layer is formed between the reflective layer and the glass substrate. Therefore, the bottom surfaces of the recesses 67, 68, and 70 of the first preferred embodiment are arranged to be shallower than the bottom surfaces of the recesses of the conventional liquid crystal display device.

In the conventional liquid crystal display device, the bottom surfaces of the recesses are formed at deep positions. Therefore, the inner surface of each recess has a large tilting angle, thus making it difficult to form a large number of effective reflection surfaces having a tilt of about 20 degrees or less within the recess. Moreover, these recesses are formed by forming the gate layer 102, the gate insulating layer 104, and the semiconductor layer 106, and then removing these layers altogether. This makes it difficult to control the tilting angle of the inner surface of each recess for increasing the effective reflection surfaces.

In the display device of the present preferred embodiment, double recesses are formed in accordance with the respective apertures in the Cs metal layer 56 and the semiconductor layer 62. Therefore, when these layers are stacked, the size, relative positioning, etc., of the apertures can be adjusted. As a result, by controlling the tilt of the reflection surface within the recesses, a large number of effective reflection surfaces having a tilt of about 20 degrees less can be formed, and more light can be reflected toward the display surface.

Next, a production method for the TFT substrate 12 according to the first preferred embodiment will be described.

FIGS. 5A-5E are plan views showing a production method for the TFT substrate 12 in the TFT section 32. FIGS. 6A-6E are diagrams showing a production method for the TFT substrate 12 in the TFT section 32, which is cross-sectional views of a portion shown by arrow A in FIG. 2A.

Figure 5A:
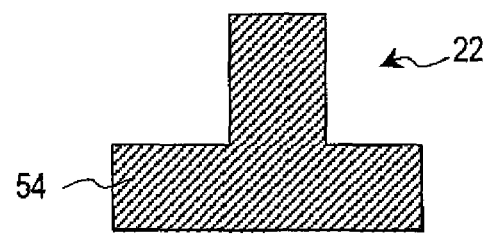
FIGS. 5A-5E are plan views showing a production method for a TFT section according to the first preferred embodiment of the present invention.
Figure 5B:
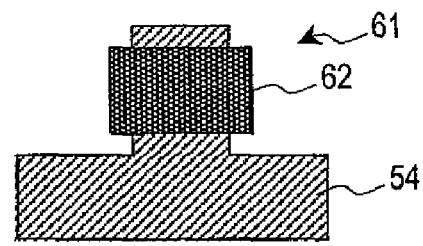
Figure 6A:
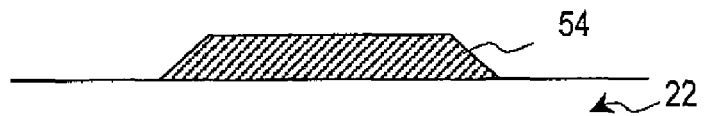
FIGS. 6A-6E are cross-sectional views showing a production method for a TFT section according to the first preferred embodiment of the present invention.

As shown in FIG. 5A and FIG. 6A, first, by a method such as sputtering, a thin metal film of Al (aluminum) is formed on the transparent substrate 22 after having been cleaned. Note that, other than Al, this thin metal film may be formed by using Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern through an exposure and development step, a dry or wet etching is performed to form the gate metal layer (metal layer) 54. The gate metal layer 54 preferably has a thickness of about 50 nm to about 1000 nm or less, for example.

Thus, the gate metal layer 54 which is formed in the TFT section 32 by photolithography technique serves as a gate electrode of the TFT. Note that, in this step, the gate lines (gate metal layer) 54 shown in FIG. 2A and the Cs metal layer 56 of the reflection section 30 shown in FIG. 3A are also formed from the same metal concurrently. The Cs metal layer 56 of the reflection section 30 may be formed by using a negative-type pattern or a positive-type pattern.

Figure 6B:
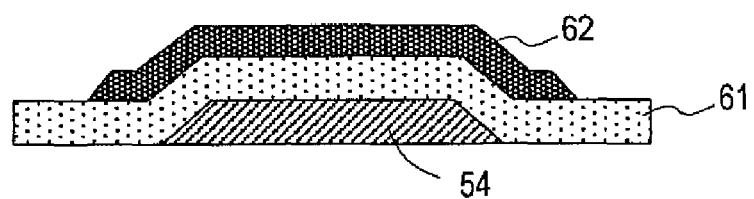

Next, as shown in FIG. 5A and FIG. 6B, by using P-CVD technique and a gaseous mixture of $SiH_4$, $NH_3$, and $N_2$, the gate insulating layer 61 composed of SiN (silicon nitride) is formed across the entire substrate surface. The gate insulating layer 61 may also be composed of $SiO_2$ (silicon oxide), $Ta_2O_5$ (tantalum oxide), $Al_2O_3$ (aluminum oxide), or the like. The thickness of the gate insulating layer 61 is preferably about 100 nm to about 600 nm, for example. In this step, the gate insulating layer 61 of the reflection section 30 shown in FIG. 3A is also formed concurrently.

Next, on the gate insulating layer 61, an amorphous silicon (a-Si) film and an $n^+$a-Si film obtained by doping amorphous silicon with phosphorus (P). The thickness of the a-Si film preferably is about 30 nm to about 300 nm, and the thickness of the $n^+$a-Si film preferably is about 20 nm to about 100 nm, for example. Thereafter, these films are shaped by photolithography technique, whereby the semiconductor layer 62 is formed. In this step, the semiconductor layer 62 of the reflection section 30 shown in FIG. 3A is also formed concurrently.

Figure 5C:
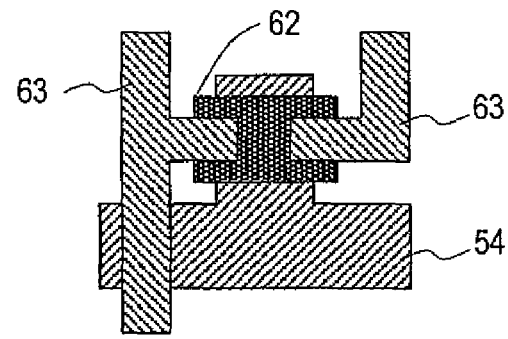
Figure 6C:
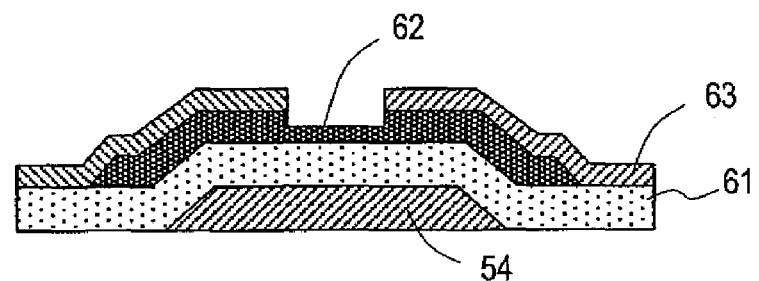

Next, as shown in FIG. 5C and FIG. 6C, a thin metal film of Al or the like is formed across the entire substrate surface by sputtering technique or the like, and a photolithography technique is performed to form the reflective layer 63. For the thin metal film, the materials which are mentioned above as materials for the gate metal layer 54 may be used. The thickness of the reflective layer 63 preferably is about 30 nm to about 1000 nm or less, for example.

In the TFT section 32, the reflective layer 63 forms a source electrode and a drain electrode of the TFT. At this time, the source line 52 in FIG. 2A is also formed as a portion of the reflective layer 63, and the reflective layer 63 of the reflection section 30 shown in FIG. 3A is also formed concurrently.

Figure 5D:
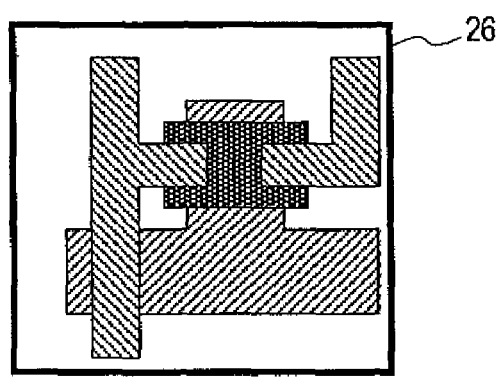
Figure 6D:
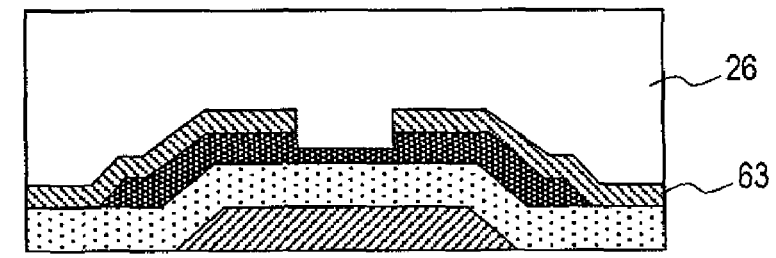

Next, as shown in FIG. 5D and FIG. 6D, a photosensitive acrylic resin is applied by spin-coating, whereby the interlayer insulating layer (interlayer resin layer) 26 is formed. The thickness of the interlayer insulating layer 26 preferably is about 0.3 μm to about 5 μm or less, for example. Although a thin film such as $SiN_x$ or $SiO_2$ may be formed by P-CVD technique as a protection film between the reflective layer 63 and the interlayer insulating layer 26, such is omitted from the figure. The thickness of the protection film preferably is about 50 nm to about 1000 nm or less, for example. The interlayer insulating layer 26 and the protection film are formed not only on the TFT section 32, but also on the entire upper surface of the transparent substrate 22 including the reflection section 30.

Figure 5E:
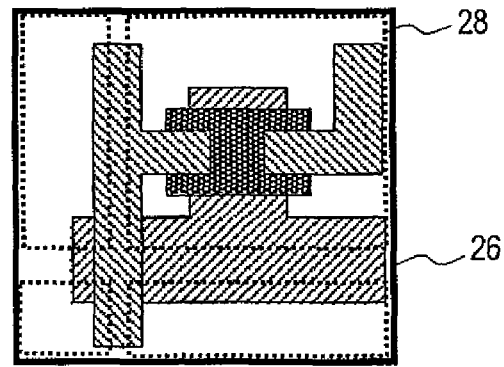
Figure 6E:
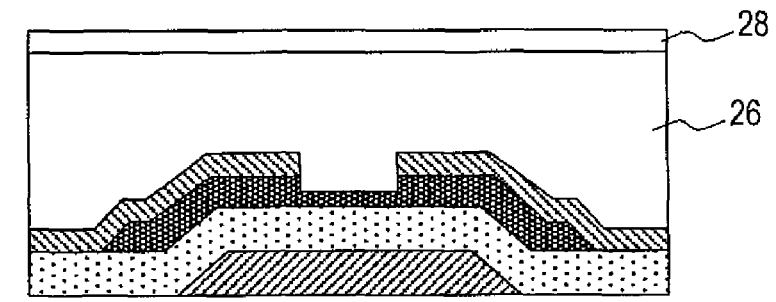

Next, as shown in FIG. 5E and FIG. 6E, on the interlayer insulating layer 26, a transparent electrode film such as ITO or IZO is formed via a sputtering technique or the like. This transparent electrode film is pattern shaped by photolithography technique, whereby the pixel electrode 28 is formed. The pixel electrode 28 is formed not only on the TFT section 32 but also on the entire upper surface of the pixel including the reflection section 30.

Next, by using FIGS. 7A-7E and FIGS. 8A-8E, a production method for the TFT substrate 12 in the reflection section 30 will be described.

FIGS. 7A-7E are plan views showing a production method for the TFT substrate 12 in the reflection section 30. FIGS. 8A-8E are diagrams showing a production method for the TFT substrate 12 in the reflection section 30, which is cross-sectional views of a portion shown by arrow C in FIG. 2B. Note that the steps shown in FIGS. 7A-7E and FIGS. 8A-8B correspond to the steps of FIGS. 5A-5E and FIGS. 6A-6E, respectively.

Figure 7A:
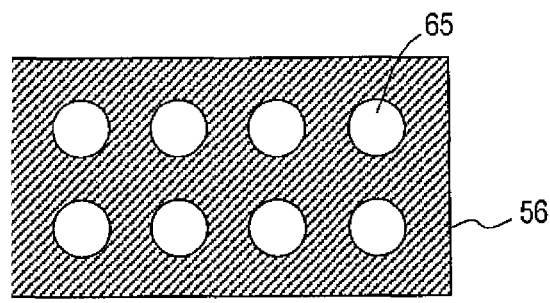
FIGS. 7A-7E are plan views showing a production method for a reflection section according to the first preferred embodiment of the present invention.
Figure 8A:
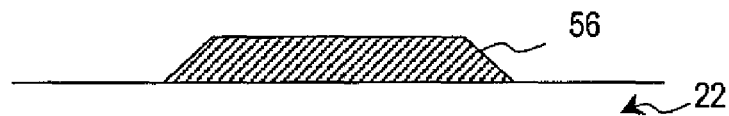
FIGS. 8A-8E are cross-sectional views showing a production method for a reflection section according to the first preferred embodiment of the present invention.

As shown in FIG. 7A and FIG. 8A, the Cs metal layer 56 in the reflection section 30 is formed by a similar method, concurrently with and from the same metal as the gate metal layer 54 in the TFT section 32. At this time, a plurality of apertures 65 are formed in the Cs metal layer 56 in the reflection section 30.

Figure 7B:
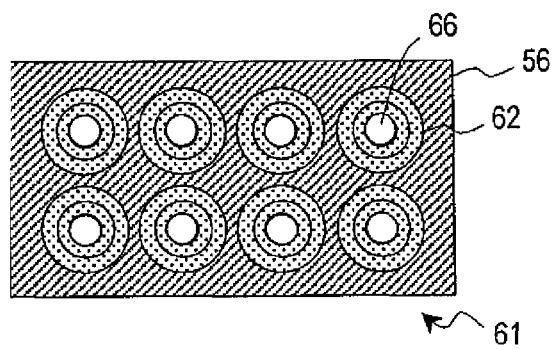
Figure 8B:
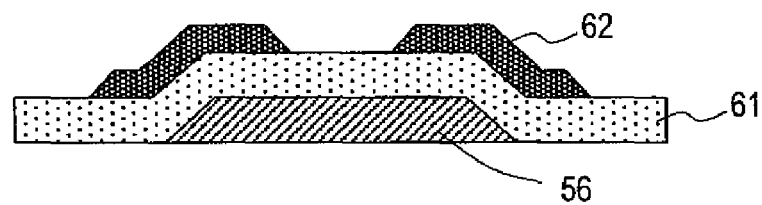

Next, as shown in FIG. 7B and FIG. 8B, the gate insulating layer 61 is formed by a method similar to that for the TFT section 32, and thereafter the semiconductor layer 62 is formed. At this time, a plurality of apertures 66 are formed in the semiconductor layer 62. The apertures 66 of the semiconductor layer 62 are formed above the apertures 65 of the Cs metal layer 56, so that, when seen from above the substrate plane, they appear to be formed inside the apertures 65 as circles that are concentric with the apertures 65.

Figure 7C:
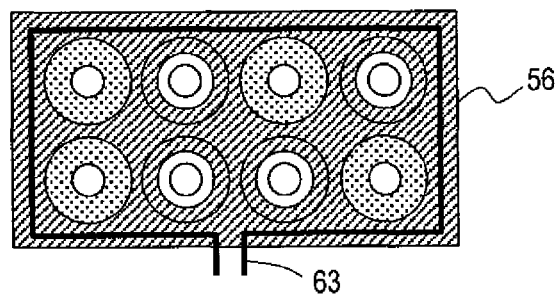
Figure 8C:
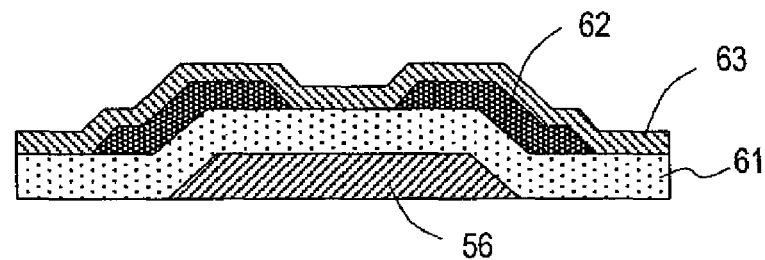

Next, as shown in FIG. 7C and FIG. 8C, the reflective layer 63 is formed by a method similar to that for the TFT section 32. At this time, recesses 67 are formed on the surface of the reflective layer 63 above the apertures 65 of the Cs metal layer 56, and recesses 68 are formed on the surface of the reflective layer 63 above the apertures 66 of the semiconductor layer 62.

Figure 7D:
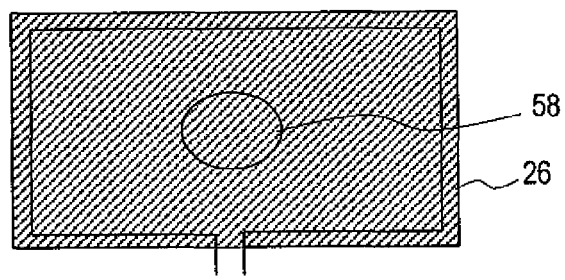
Figure 8D:
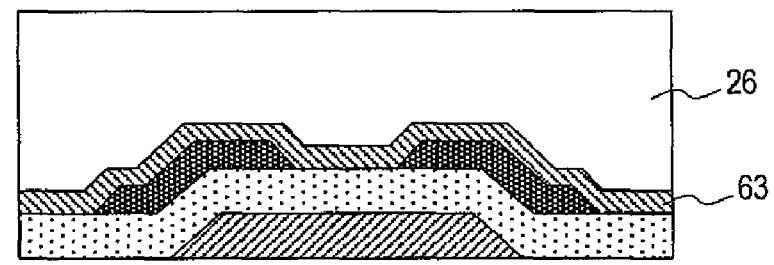

Next, as shown in FIG. 7D and FIG. 8D, the interlayer insulating layer 26 is formed from photosensitive acrylic resin. Thereafter, through a development process using an exposure apparatus, a contact hole 58 is formed near the center of the reflection section 30.

Figure 7E:
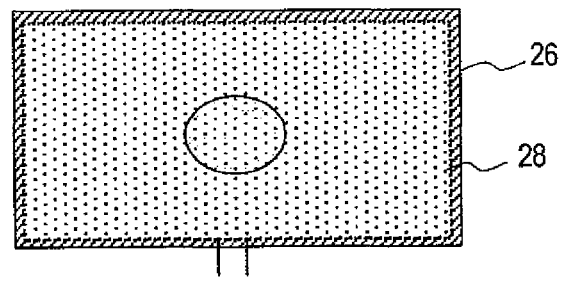
Figure 8E:
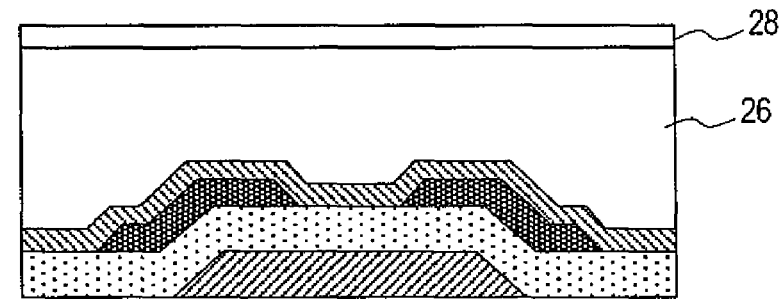

Next, as shown in FIG. 7E and FIG. 8E, the pixel electrode 28 is formed. In the reflection section 30, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected with the pixel electrode 28 via the contact hole 58.

Preferably, as many recesses 67, 68, and 70 as possible are formed. Therefore, it is preferable that as many apertures in the Cs metal layer 56 and the semiconductor layer 62 as possible are formed on the reflection surfaces, within the limits of the mask and photoexposure in the production steps. The preferable size of the apertures in the Cs metal layer 56 and the semiconductor layer 62 preferably is about 2 μm to about 10 μm in diameter, for example.

Second Preferred Embodiment

Hereinafter, a second preferred embodiment of the liquid crystal display device according to the present invention will be described with reference to the drawings. Note that the same reference numerals are attached to those elements which are identical to the constituent elements in the first preferred embodiment, and the descriptions thereof are omitted.

Figure 9:
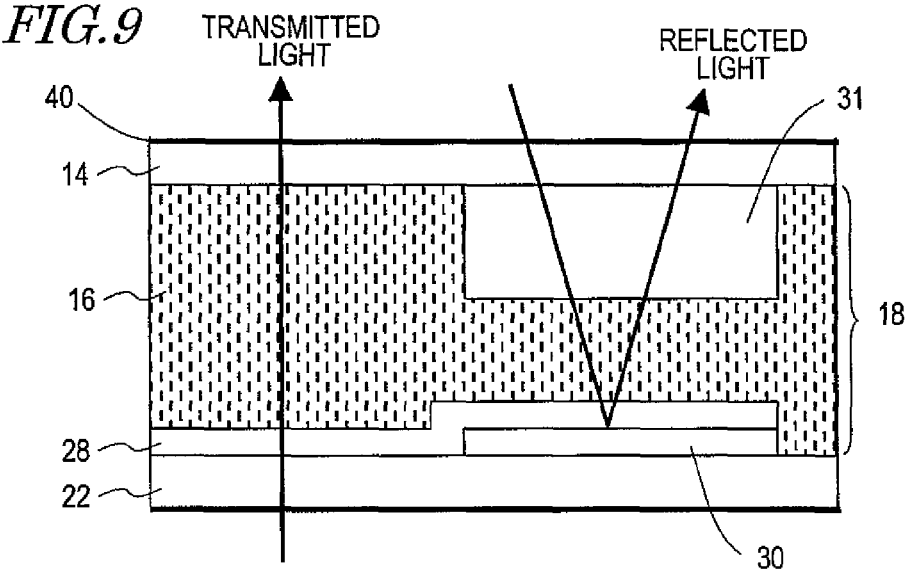
FIG. 9 is a cross-sectional view showing a liquid crystal display device according to a second preferred embodiment of the present invention.

FIG. 9 is a diagram schematically showing a cross-sectional shape of the liquid crystal display device of the present preferred embodiment. This liquid crystal display device is based on the liquid crystal display device of the first preferred embodiment from which the interlayer insulating layer 26 is excluded, and is identical to the liquid crystal display device of the first preferred embodiment except for the points discussed below. Note that, in FIG. 9, the detailed structure of the counter substrate 14 and the TFT section 32 are omitted from illustration.

As shown in the figure, in the second preferred embodiment, the interlayer insulating layer 26 is not formed and therefore the pixel electrode 28 is formed upon the reflective layer 63 in the reflection section 30 and in the TFT section 32, via an insulating film not shown. The structure and production method for the reflection section 30 and the TFT section 32 are the same as in the first preferred embodiment except that the interlayer insulating layer 26 is eliminated. The pixel layout and wiring structure in the liquid crystal display device are also similar to what is shown in FIG. 2A.

Also with this construction, as in the first preferred embodiment, the effective reflection surfaces of the reflective layer 63 are expanded in area, so that more light can be reflected toward the display surface.

Third Preferred Embodiment

Hereinafter, a third preferred embodiment of the liquid crystal display device according to the present invention will be described with reference to the drawings. Note that the same reference numerals are attached to those elements which are identical to the constituent elements in the first preferred embodiment, and the descriptions thereof are omitted.

Figure 10:
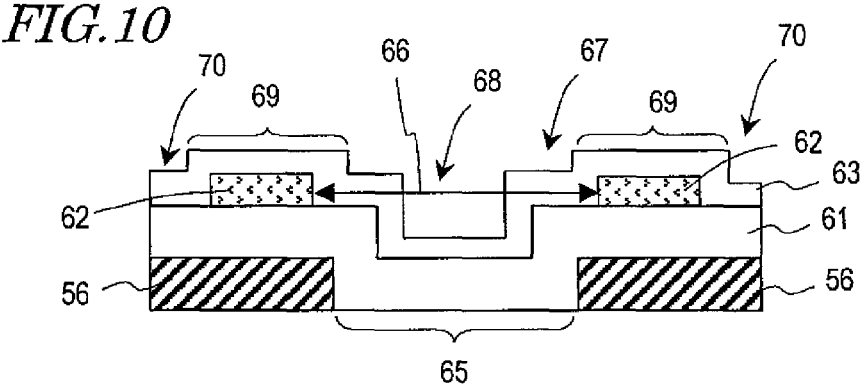
FIG. 10 is a cross-sectional view showing a liquid crystal display device in a reflective layer according to a third preferred embodiment of the present invention.

FIG. 10 is a diagram schematically showing a cross-sectional shape of the reflection section 30 in the liquid crystal display device of the present preferred embodiment. This liquid crystal display device differs from the first preferred embodiment with respect to the relative positioning of the apertures 65 of the Cs metal layer (metal layer) 56 and the apertures 66 of the semiconductor layer 62 in the reflection section 30, but otherwise has the same construction as that in the first preferred embodiment.

As shown in the figure, in the third preferred embodiment, when seen from above the surface of the substrate, the apertures 65 in the Cs metal layer 56 appear to be located inside the apertures 66 of the semiconductor layer 62. Therefore, the recesses 67 formed on the surface of the reflective layer 63 are formed above the apertures 66 of the semiconductor layer 62, and the recesses 68 located inside the recesses 67 are formed above the apertures 65 of the Cs metal layer 56.

Also with this construction, as in the first preferred embodiment, the effective reflection surfaces of the reflective layer 63 are expanded in area, so that more light can be reflected toward the display surface.

Fourth Preferred Embodiment

Hereinafter, a fourth preferred embodiment of the liquid crystal display device according to the present invention will be described with reference to the drawings. Note that the same reference numerals are attached to those elements which are identical to the constituent elements in the first preferred embodiment, and the descriptions thereof are omitted.

Figure 11:
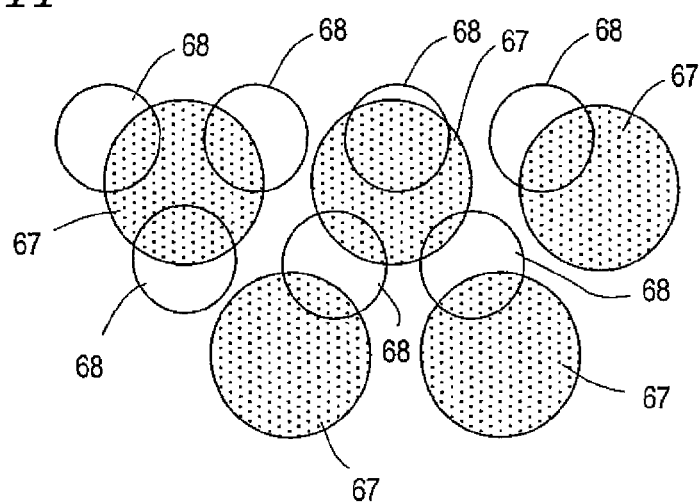
FIG. 11 is a plan view showing a reflective layer in a liquid crystal display device according to a fourth preferred embodiment of the present invention.

FIG. 11 is a plan view of the recesses 67 and recesses 68 of the reflective layer 63 in the reflection section 30 of the present preferred embodiment, as seen from above the substrate plane. As shown in the figure, in this preferred embodiment, the recesses 67 and the recesses 68 are not arranged in a manner of concentric circles, but are disposed so that their center positions differ from one another. Otherwise, the construction is the same as that of first preferred embodiment.

In the present preferred embodiment, when the semiconductor layer 62 is formed, the center positions of the apertures 66 are arranged so as to differ from the center positions of the apertures 65 in the underlying Cs metal layer (metal layer) 56.

Therefore, when the reflective layer 63 is formed on the semiconductor layer 62, the centers of the recesses 68 are displaced from the centers of the recesses 67. Each recess 67 may be placed so as to overlap a plurality of recesses 68, or each recess 68 may be arranged so as to overlap a plurality of recesses 67.

Also with this construction, as in the first preferred embodiment, the effective reflection surfaces of the reflective layer 63 are expanded in area, so that more light can be reflected toward the display surface. Note that the construction of the reflection section 30 of the present preferred embodiment can also be used for the reflection section 30 of the second preferred embodiment. Moreover, as in the third preferred embodiment, the apertures 66 of the semiconductor layer 62 may be formed so as to be larger than the apertures 65 of the Cs metal layer 56.

Fifth Preferred Embodiment

Hereinafter, a fifth preferred embodiment of the liquid crystal display device according to the present invention will be described with reference to the drawings. Note that the same reference numerals are attached to those elements which are identical to the constituent elements in the first preferred embodiment, and the descriptions thereof are omitted.

Figure 12:
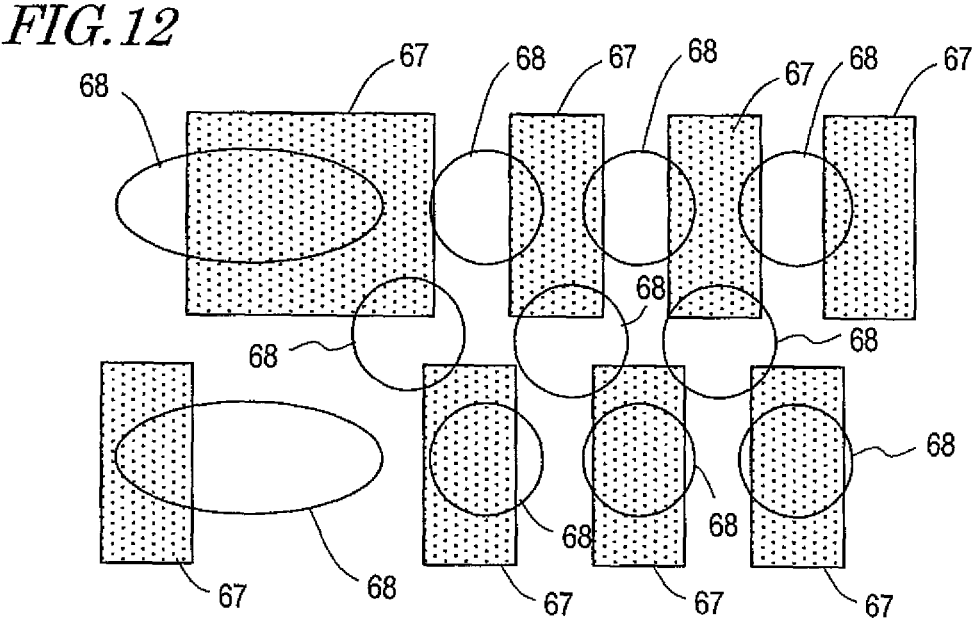
FIG. 12 is a plan view showing a reflective layer in a liquid crystal display device according to a fifth preferred embodiment of the present invention.

FIG. 12 is a plan view of the recesses 67 and the recesses 68 of the reflective layer 63 in the reflection section 30 of the present preferred embodiment, as seen from above the substrate plane. As shown in the figure, in this preferred embodiment, the recesses 67 are preferably formed so as to be quadrangular or substantially quadrangular, whereas the recesses 68 are preferably formed so as to be circular or elliptical, or substantially circular or substantially elliptical. The recesses 68 are arranged so as to partly overlap the recesses 67. The quadrangular or substantially quadrangular shapes and sizes of the recess 67 are not identical, but a number of different shapes and sizes are combined.

In the present preferred embodiment, when the Cs metal layer (metal layer) 56 is formed, the apertures 65 are formed so as to be quadrangular or substantially quadrangular, and when the semiconductor layer 62 is formed, the apertures 66 are formed so as to be circular or elliptical, or substantially circular or substantially elliptical. Therefore, when the reflective layer 63 is formed on the semiconductor layer 62, the recesses 67 are formed above the quadrangular or substantially quadrangular apertures 65 of the Cs metal layer 56, and the recesses 68 are formed above the circular or elliptical, or substantially circular or substantially elliptical apertures 66 of the semiconductor layer 62.

Also with this construction, as in the first preferred embodiment, the effective reflection surfaces of the reflective layer 63 are expanded in area, so that more light can be reflected toward the display surface. Note that the construction of the reflection section 30 of the present preferred embodiment can also be used for the reflection section 30 of the second preferred embodiment. Moreover, the apertures 66 of the semiconductor layer 62 may be formed so as to be quadrangular, whereas the apertures 65 of the Cs metal layer 56 may be formed so as to be circular or elliptical, or substantially circular or substantially elliptical. Moreover, the apertures 66 of the semiconductor layer 62 and the apertures 65 of the Cs metal layer 56 may each be formed into a shape which combines quadrangular, circular, and elliptical, or substantially quadrangular, substantially circular or substantially elliptical.

Furthermore, in each of the above-described preferred embodiments, it is preferable that as many recesses 67, 68, and 70 as possible are formed within the reflection section 30.

Therefore, the size and shape of each recess are not limited to what is described above, but many shapes are possible, such as polygons other than quadrangles, recesses with saw-toothed edges, or combinations thereof. Moreover, by forming the portions of the Cs metal layer 56 and the semiconductor layer 62 corresponding to the apertures using a positive-type pattern, the recesses 67, 68, and 70 may be formed as protrusions.

Note that the liquid crystal display device encompasses display apparatuses, television sets, mobile phones, etc., in which a liquid crystal panel is utilized. Moreover, although the present preferred embodiments illustrate transflective-type liquid crystal display devices as examples, a reflection-type liquid crystal display device having a similar configuration to the aforementioned reflection section would also be encompassed as one configuration of the present invention.

Moreover, since the liquid crystal display device according to preferred embodiments of the present invention is formed by the above-described production methods, it can be produced with the same materials and steps as those for a transmission-type liquid crystal display device. Therefore, at low cost, a liquid crystal display device having reflection efficiency can be provided.

According to preferred embodiments of the present invention, transflective-type and reflection-type liquid crystal display devices having a high image quality can be provided at low cost. Liquid crystal display devices according to preferred embodiments of the present invention can be suitably used for various liquid crystal display devices, and suitably used for transflective-type and reflection-type liquid crystal display devices which perform display by utilizing reflected light, e.g., mobile phones, onboard display device such as car navigation systems, display devices of ATMs and vending machines, etc., portable display devices, laptop PCs, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
   a reflection region arranged to reflect incident light toward a display surface; wherein
   the reflection region includes a reflective layer provided on a substrate;
   the reflection region includes a first recess provided in a surface of the reflective layer and a second recess provided in the surface of the reflective layer in the first recess; and
   the first recess and the second recess are tilted with respect to the display surface such that a slope of the first recess and a slope of the second recess each define an angle of about 20° or less with respect to the display surface; wherein
   a metal layer including an aperture, an insulating layer provided above the metal layer, and a semiconductor layer including an aperture and being provided above the insulating layer are provided under the reflective layer in the reflection region;
   the aperture of the semiconductor layer is located inside the aperture of the metal layer; and
   the first recess is disposed in proximity to the aperture of the metal layer, and the second recess is disposed in proximity to the aperture of the semiconductor layer.

2. The liquid crystal display device of claim 1, wherein the surface of the reflective layer is arranged inside the first recess but outside the second recess, and the reflective layer includes a surface which is substantially parallel to a planar direction of the substrate.

3. The liquid crystal display device of claim 1, wherein
   the reflection region includes a third recess provided in the surface of the reflective layer, the third recess being disposed in a region where a metal layer and an insulating layer are stacked but where a semiconductor layer is not provided.

4. The liquid crystal display device of claim 1, wherein a plurality of the first recesses and the second recesses are disposed in the reflection region.

5. The liquid crystal display device of claim 1, wherein the first recess has a circular or substantially circular shape.

6. The liquid crystal display device of claim 1, wherein the second recess has a circular or substantially circular shape.

7. The liquid crystal display device of claim 1, wherein
   the first recess and the second recess each have a circular or substantially circular shape, and a center position of the first recess and a center position of the second recess are identical or substantially identical.

8. The liquid crystal display device of claim 1, wherein the first recess and the second recess each have a circular or substantially circular shape, and a center position of the first recess and a center position of the second recess are different.

9. The liquid crystal display device of claim 1, wherein at least one of the first recess and the second recess has an elliptical or substantially elliptical shape.

10. The liquid crystal display device of claim 1, wherein
    at least one of the first recess and the second recess has a quadrangular or substantially quadrangular shape.

11. The liquid crystal display device of claim 1, further comprising:
    a semiconductor device provided on the substrate; wherein
    the metal layer, the semiconductor layer, and the reflective layer are made of the same materials as those of a gate electrode, a semiconductor portion, and source and drain electrodes of the semiconductor device, respectively.

12. A production method for a liquid crystal display device having a reflection region arranged to reflect incident light toward a display surface, comprising:
    a step of forming a metal layer including an aperture, in the reflection region;
    a step of forming an insulating layer, above the metal layer and the aperture of the metal layer;
    a step of forming a semiconductor layer including an aperture, above the insulating layer; and
    a step of forming a reflective layer, above the semiconductor layer and the aperture of the semiconductor layer; wherein
    the aperture of the semiconductor layer is formed inside the aperture of the metal layer;
    a first recess is formed on a surface of the reflective layer above the aperture of the metal layer, and a second recess is formed on the surface of the reflective layer inside the first recess; and
    the first recess and the second recess are tilted with respect to the display surface such that a slope of the first recess and a slope of the second recess each define an angle of about 20° or less with respect to the display surface.

13. The production method of claim 12, wherein the metal layer and the semiconductor layer each have a plurality of apertures.

14. The production method of claim 12, wherein the aperture of the metal layer and the aperture of the semiconductor layer have a circular or substantially circular shape.

15. The production method of claim 14, wherein the circular or substantially circular aperture of the metal layer and the circular or substantially circular aperture of the semiconductor layer have an identical center position.

16. The production method of claim 14, wherein the circular or substantially circular aperture of the metal layer and the circular or substantially circular aperture of the semiconductor layer have different center positions.

17. The production method of claim 12, wherein at least one of the aperture of the metal layer and the aperture of the semiconductor layer has an elliptical or substantially elliptical shape.

18. The production method of claim 12, wherein at least one of the aperture of the metal layer and the aperture of the semiconductor layer has a quadrangular or substantially quadrangular shape.

19. The production method of claim 12, wherein the liquid crystal display device includes a semiconductor device, a gate electrode of the semiconductor device is formed in the step of forming the metal layer, a semiconductor section of the semiconductor device is formed in the step of forming the semiconductor layer, and source and drain electrodes of the semiconductor device are formed in the step of forming the semiconductor device.

* * * * *